United States Patent
Birle

[15] 3,661,521

[45] May 9, 1972

[54] REFINING OF CUBIC BORON NITRIDE

[72] Inventor: John D. Birle, Galloway, Ohio
[73] Assignee: General Electric Company
[22] Filed: Feb. 13, 1970
[21] Appl. No.: 11,347

[52] U.S. Cl. ................................................23/191, 23/312
[51] Int. Cl. ..............................................C01b 21/06
[58] Field of Search........................................23/191, 312 R

[56] References Cited

UNITED STATES PATENTS 2,947,617   8/1960   Wentorf..............................23/191 X
3,212,851   10/1965  Bundy et al..............................23/191

Primary Examiner—Oscar R. Vertiz
Assistant Examiner—Charles B. Rodman
Attorney—Allard A. Braddock, Harold J. Holt, Frank L. Neuhauser, Oscar B. Waddell and Joseph B. Forman

[57] ABSTRACT

Cubic boron nitride is refined from a mixture of cubic boron nitride and hexagonal boron nitride by adding to the mixture lithium hydroxide, sodium hydroxide, or potassium hydroxide, or mixtures thereof and water as may be necessary to control the hydroxide fusion temperature, heating to a low-temperature molten state to dissolve the hexagonal boron nitride, and separating the cubic boron nitride from the remainder of the mixture.

7 Claims, No Drawings

REFINING OF CUBIC BORON NITRIDE

BACKGROUND OF THE INVENTION

Wentorf U.S. Pat. No. 2,947,617, which is assigned to the same assignee as the present invention, discloses the production of boron nitride in a cubic crystalline form similar to the mineral zincblende. This material, which does not occur naturally, was formed by subjecting a "soft" hexagonal form of boron nitride crystals to high temperatures at super-high pressures in the presence of a catalyst. It was at first thought to be as hard as diamond but was found upon further investigation to be slightly less hard than diamond. However, both substances are considerably harder than any other materials presently known.

Later it was discovered that another extremely hard form of boron nitride having a hexagonal crystalline structure could be formed from the soft form of boron nitride by subjecting the soft form to pressures in excess of 100 kilobars at a temperature preferably in excess of room temperature. This form of boron nitride had a hexagonal crystal structure analogous to that of the mineral wurtzite. It is disclosed and claimed in Bundy et al. U.S. Pat. No. 3,212,851 which also is assigned to the same assignee as the present invention. Accordingly, as used in this specification and claims, the term "cubic boron nitride" will include both the zincblende and wurtzite forms. As used herein the terms "hexagonal BN" and "Hexagonal boron nitride" will refer to the soft form of boron nitride.

The first syntheses of both diamond and cubic boron nitride were performed in high-temperature, high-pressure apparatus in the presence of catalysts. Soon after catalytic syntheses were announced efforts were made to synthesize diamond utilizing the shock waves incidental to explosions. DeCarli U.S. Pat. No. 3,238,019 discloses the synthesis of diamond by a shock wave technique. This technique has also been utilized in the production of cubic boron nitride. Shock waves maintain high pressures for a fraction of a second. During this time some of the original charge is not converted and some of it reverts to hexagonal BN after momentarily being converted to cubic boron nitride. As a result, yields of the desired end product are rather low and the charge ends up as a mixture of cubic boron nitride and hexagonal BN plus contaminants.

In the case of cubic boron nitride produced by shock waves, separation of the cubic boron nitride from unreacted material becomes a difficult problem due to the fact that both cubic boron nitride and hexagonal BN are quite similar chemically. Consequently, it is the aim of this invention to provide a means for effecting the sharp separation of cubic boron nitride from hexagonal boron nitride.

SUMMARY OF THE INVENTION

In accordance with this invention, it has been found that hydroxides of lithium, sodium or potassium, or mixtures thereof, when in a low-temperature molten condition will dissolve hexagonal boron nitride while having no discernible effect upon cubic boron nitride. At temperatures of the order of 700° C the molten hydroxides will dissolve cubic boron nitride. As the temperature of the molten hydroxide approaches 700° C a larger proportion of cubic boron nitride will go into solution. Consequently, the separation is carried out at a temperature of less than 350° C and preferably at a temperature of about 300° C in order to dissolve the hexagonal boron nitride while leaving cubic boron nitride undissolved. The term "low-temperature molten condition" is, therefore, defined as a temperature of not more than about 350° C. Water may be added to the hydroxide to reduce the fusion temperature in cases where the anhydrous hydroxide has a melting point in excess of 350°C.

DESCRIPTION OF THE PREFERRED EMBODIMENT

The practice of this invention applies to a mixture containing both cubic boron nitride and hexagonal boron nitride and which may also contain other materials which it is desired to separate from cubic boron nitride. In accordance with the invention it has been discovered that there is such a great difference in reaction rates of cubic boron nitride and hexagonal boron nitride with certain fused hydroxides at temperatures of about 350° C. or less, that sharp separation of the two components may be effected at these temperatures. Thus, at hydroxide temperatures lower than 350° C. cubic boron nitride is essentially unreactive. At the same temperatures hexagonal boron nitride is dissolved by the hydroxides.

The three hydroxides used in the present invention have melting points which vary rather widely. However, all three of the hydroxides form eutectic mixtures with each other and with water. Thus, water may be added in whatever quantity is necessary to bring the reaction mixture down to an operating temperature of about 300° C. When a single hydroxide is used the invention is therefore carried out with water present in the reaction mixture. Water may also be present when the reaction is carried out with a mixture of two or more of the hydroxides. However, a wide composition range of hydroxide mixtures have fusion temperatures below 300° C. and for these water is not so important.

The following Example 1 illustrates the separation of cubic boron nitride from a mixture of cubic boron nitride and hexagonal boron nitride produced by the shock wave process.

EXAMPLE 1

A sample of 465 mg. powdered hexagonal boron nitride was shocked at 450 kilobars of 1 microsecond, converting a portion of it to cubic boron nitride. The mixed phase sample was placed in a covered 250 ml. nickel crucible with 10g. sodium hydroxide pellets and a small amount of water. It was heated to 300° C. slowly over a seven-hour period and allowed to cool. The cooled contents of the crucible were washed into a 600 ml. beaker with distilled water and filtered through a millipore filter. The wet filter was then dissolved in conc. $H_2SO_4$/conc. $HNO_3$ and the filtrate was cleaned of residual contamination in HCl. Distilled water was again added, the mixture heated and cooled once more and then filtered through a second millipore filter and dried. 206 mg. of cubic boron nitride powder were scraped from the filter surface. Approximately 5 mg. additional cubic boron nitride powder was lost via entrapment in the pores of the filter.

Examples 2–5 below illustrate the separation of cubic boron nitride produced by the catalyst method of the Wentorf patent from hexagonal boron nitride.

A high-pressure, high-temperature cell containing cubic boron nitride, hexagonal BN, and water-soluble catalyst material was first treated with boiling water to remove soluble salts. Solid phases were separated from the solution by means of a centrifuge, and alternately washed with water and centrifuged three times. The solid material, consisting of hexagonal BN and cubic boron nitride, was dried at 100° C. and mixed for 5 minutes in a 100 ml. jar.

One gram samples were weighed into each of four 100 ml. nickel evaporating dishes. To the first was added 10 grams NaOH and 1 ml. $H_2O$ [Example 2]; to the second, 10 grams of a eutectic mixture of NaOH and KOH (MP 170° C.) [Example 3]; to the third 10 grams of a eutectic mixture of NaOH and LiOH (MP 210° C.) [Example 4]; and to the fourth 10 grams of a eutectic mixture of KOH and LiOH (MP 227° C.) [Example 5]. The samples were well mixed with the hydroxides with nickel wires, which were left in the dishes.

The four dishes were placed in a cool muffle furnace and slowly brought to 300°±20° C. over a ½ hour period. In each case, reaction took place as soon as the hydroxides melted, as evidenced by evolution of ammonia and frothing of the melt. Fusion was continued for two hours during which time each sample was periodically stirred to break the froth and to clean the sides of the dish. Water was added dropwise to dish No. 1 to keep the mass molten.

The dishes were cooled, placed in 600 ml. beakers, covered with water, and heated to boiling. As soon as the melt dissolved, the dishes and wires were removed, and any adhering material washed back into the beakers. The alkaline solution was decanted along with a small amount of flocculent nickel hydroxide. The samples remaining in the beakers were washed twice with water, and treated for 5-10 minutes with 4:1 hydrochloric acid solution to dissolve any remaining nickel hydroxide. They were then washed three times with deionized water, transferred to Petri dishes, dried at 100° C., examined, and weighed. 0.1 gram of clean, pure cubic boron nitride was recovered from each sample. Other than slight etching of some crystal surfaces, no evidence of attack was noted. No hexagonal BN was found to be present.

As may be seen particularly from Examples 2-5, extremely sharp separations of cubic boron nitride from hexagonal BN can be effected at a hydroxide fusion temperature controlled at about 300° C. Higher temperatures can also be used for this separation but as temperatures increase there is an increasing tendency for cubic boron nitride to be dissolved by the hydroxides. Thus, the lower fusion temperatures represent a preferred embodiment of the invention.

What I claim as new and desire to secure by Letters Patent of the United States is:

1. The method of extracting pure cubic boron nitride from a mixture of cubic boron nitride and hexagonal boron nitride which comprises adding to said mixture the hydroxide of an alkali metal selected from the group consisting of lithium, sodium, potassium, mixtures thereof, and water as may be necessary to reduce the hydroxide melting temperature below about 350° C, heating the resulting mixture to a low-temperature molten condition to dissolve the hexagonal boron nitride, and separating the cubic boron nitride from the remainder of the mixture.

2. The method of claim 1 wherein the hydroxide temperature is about 300° C.

3. The method of claim 1 wherein the hydroxide is sodium hydroxide.

4. In the production of refined cubic boron nitride from a mixture containing cubic boron nitride and hexagonal boron nitride, the steps of dissolving the hexagonal boron nitride in a hydroxide molten at about 350° C selected from the group consisting of lithium, sodium, potassium, and mixtures thereof, and separating the solution from the cubic boron nitride.

5. The method of claim 4 wherein the step of dissolving hexagonal boron nitride in hydroxide is carried out at about 300° C.

6. The method of claim 4 wherein the hydroxide used is sodium hydroxide.

7. The method of claim 4 wherein water is added to the hydroxide to maintain the hydroxide fusion temperature at about 300° C.

* * * * *